United States Patent [19]
Okabayashi et al.

[11] Patent Number: 5,484,324
[45] Date of Patent: Jan. 16, 1996

[54] STAMPER FOR INJECTION MOLDING

[75] Inventors: Norio Okabayashi; Motohiro Kawasaki; Kazushi Takahashi, all of Himeji, Japan

[73] Assignee: Daicel Chemical Industries, Ltd., Japan

[21] Appl. No.: 965,461

[22] Filed: Oct. 23, 1992

Related U.S. Application Data

[62] Division of Ser. No. 773,750, Oct. 10, 1991, abandoned.

[51] Int. Cl.$^6$ ........................................ B24B 1/00
[52] U.S. Cl. ........................................ 451/28; 451/57
[58] Field of Search ................ 51/281 R, 281 P, 51/326, 327, 281 SF, 328; 425/810; 451/28, 61, 57, 58, 63, 59

[56] References Cited

U.S. PATENT DOCUMENTS

| 4,435,922 | 3/1984 | Prusak | 425/810 |
| 4,783,041 | 11/1988 | Sakaida et al. | 425/810 |

*Primary Examiner*—Robert A. Rose
*Attorney, Agent, or Firm*—Pennie & Edmonds

[57] ABSTRACT

A stamper for injection-molding a plastic substrate for an optical disk characterized in that a rear surface of the stamper a surface roughness between 0.3 to 2.0 S.

4 Claims, 1 Drawing Sheet

STAMPER FOR INJECTION MOLDING

This is a division of application Ser. No. 07/773,750, filed Oct. 10, 1991, now abandoned.

BACKGROUND OF THE INVENTION

1. Field of the Invention

The present invention relates to an improvement in a stamper which is used for injection-molding plastic substrates for optical disks including read-only type optical disk such as audio-disks and video-disks, direct-write-after-read (DRAW) type optical disks and erasable DRAW (E-DRAW) type optical disks which are used as document files, video files and external memories of computers.

A single drawing attached FIGS. 1(a)–1(d) illustrates conventional production steps of the stamper which is used for molding plastic substrates for optical disks.

2. Description of the Related Arts

First of all, we will refer to an attached single drawing which illustrates typical production steps of the stamper for molding plastic substrates for optical disks.

At first, a focussed laser beam whose intensity may be modified is directed onto a thin film of photo-resist (2) coated on a polished surface of a base disk of glass (1) as shown in FIG. 1(a). The glass disk (1) is revolved so that the photo-resist is exposed in a predetermined pattern (2') of trucking grooves and/or of a series of signal pits, shown in FIG. 1(b). A master disk, FIG. 1(b), is obtained by developing the exposed photo-resist.

Then, an electro-conductive thin film is deposited by electroless plating or sputtering technique on a surface of the patterned surface of the photo-resist of the master disk thus obtained.

Finally, an uniform nickel layer having a thickness of about 300 μm is deposited on the electro-conductive thin film by electro-deposition or plating process in a bath containing nickel ions. The resulting deposited nickel disk is pealed off the master disk at the electro-conductive thin film and an outer periphery of the nickel disk is trimmed to obtain a "stamper" (3), as shown in FIG. 1(c), having a predetermined diameter onto which the relief pattern of trucking grooves and/or of a series of signal pits is transferred from the master disk.

The stamper is secured on a surface of one (5) of mold halves (5, 6) in such a manner that a molding cavity (7) is defined between a front surface of the stamper and an opposite surface of another mold half (6), as shown in FIG. 1(d). When a plastic substrate is molded in the molding cavity (7) in an injection molding machine, molten resin is injected into the molding cavity (7) so that the relief pattern of trucking grooves and/or of signal pits is transferred from the stamper (3) onto a surface of the plastic substrate.

In the prior arts, it is usual practice to polish the rear surface (4) of the stamper (3) in such a manner that the surface roughness on the rear surface becomes under 0.1 S measured according to Japanese Standard JIS B 0601 in order to realize uniform thermal conduction from the nickel stamper (3) to the molded plastic disk through a contact interface between the nickel stamper surface and the plastic surface:. In fact, if the rear surface (4) of the nickel stamper is not polished, file surface roughness on the rear surface of the nickel stamper is so high that a defect so-called "orange peals" is marked on the plastic disk obtained.

Precision required in the molding of plastic substrates for optical disks is extremely higher comparing to that is required in ordinary plastic articles. In the case of the plastic substrate for optical disks, transferability of trucking grooves and/or signal pits from the stamper to the plastic disk is the most important factor in addition to the dimensional stability such as uniformity in thickness with no distortion and uniformity of optical properties such as birefringence.

In order to improve the transferability of trucking grooves and/or signal pits, molten resin must be forced onto a patterned surface of the stamper at a high pressure in the molding stage. However, under such a high pressure condition, it is difficult to release the molded plastic article from the patterned surface of the stamper. If the molded plastic disk is not release smoothly or easily from the stamper, the transferred relief pattern is spoiled during the releasing stage resulting in that a defect so-called "cloud" which is detectable even by naked eyes is left on the molded plastic disk. This means that the transferability of the relief pattern from the stamper to the molded plastic disk and the releasing property of the molded plastic disk from the stamper are in an offset relation. Therefore, it has been requested to compromise or balance the transferability and the releasing property.

A variety of stamper models have been proposed in order to improve the releasing property. For example, Japanese Patent laid-open No. 59-218,821 discloses a stamper having a surface releasing layer of organic compound coated on the relief pattern of the stamper. Japanese Patent laid-open No. 62-119,751 discloses a stamper having a surface releasing layer of oxide or nitride deposited on the relief pattern of the stamper. Japanese Patent laid-open No. 62-180,541 discloses a stamper having an oxide layer deposited on the rear surface of the stamper.

All of these solutions utilize such phenomena that slipping property of injected molten resin on the relief pattern surface of the stamper is increase or that cooling of molten resin is retarded by providing the surface coating layer made of different material other than nickel on the relief pattern surface or the rear surface of the stamper in order to balance the transferability of tracking grooves and/or signal pits and the releasability of the molded substrate from the stamper. These solutions have such a demerit that they need expensive apparatus for depositing or coating the surface layer such as a vacuum units like vacuum-deposition machine, a CVD machine or a sputtering machine, resulting in that manufacturing cost of the stamper increases. The present inventors discovered an effective solution to solve the demerit of the prior art and completed the present invention.

An object of the present invention is to provide a very simple method for retarding the cooling rate of molten resin on the stamper surface in order to improve the releasing property of the molded substrate from the stamper as well as to eliminate the defect of "cloud" which is observed in the molded substrate.

SUMMARY OF THE INVENTION

The present invention provides a stamper for injection-molding a plastic substrate for an optical disk characterized in that a rear surface of the stamper has a surface roughness between 0.3 to 2.0 S. In this specification, the surface roughness is expressed by values measured according to the Japanese Standard JIS B 0601.

The present invention is based on such present inventors' finding that the releasing property of the molded substrate from the stamper is improved and also the defect of "cloud"

is eliminated by re-roughen intentionally a rear surface of the stamper which was polished under a surface roughness of 0.1 S to a surface roughness between 0.3 to 2.0 S.

When the surface roughness on the rear surface of the stamper became rougher than the range defined according to the present invention, it was observed that a surface of the molded plastic substrate did not become uniform. This may be caused by non uniform distribution of temperature. In an extreme case, an uneven rear surface pattern will be transferred to a molded plastic substrate. Therefore, the surface roughness must be with in the range between 0.3 S to 2.0 S measured according to the Japanese Standard JIS B 0601.

The reason why file stamper having such a re-roughened rear surface according to the present invention shows an improved transferability of the relief pattern can be explained as following:

Since the re-roughened rear surface of the stamper according to the present invention makes contact with a polished surface of a mold half on which the stamper is secured at a reduced contact surface area, heat conduction from the stamper to the mold half when the molten resin is injected onto the stamper surface is limited so that solidification rate or cooling rate of the molten resin is retarded, in other words, the time duration when the resin on the stamper surface is maintained in a fluid condition is extended. This results in improvement in the transferability.

The reason why the stamper having such a re-roughened rear surface according to the present invention shows an improved releasing property from the stamper can be explained as following:

Such a trouble that a molded plastic substrate stick to a stamper may be caused by an too early release of the molded plastic substrate from the stamper. Namely, it the molded plastic substrate is released too early, stress is left on such portions of the molded resin that penetrate into recesses of the relief pattern of the stamper. Such stress resists to release of the molded plastic substrate, resulting in that it becomes difficult to separate or release the molded plastic substrate from the stamper. According to the present invention, the solidification rate or cooling rate of the molten resin is retarded owing to the re-roughened rear surface of the stamper and hence the above-mentioned stress is released.

As mentioned above, there is an offset relation between the transferability of the relief pattern from the stamper to the molded plastic disk and the releasing property of the molded plastic disk from the stamper. In fact, it is often observed such a fact the releasing property is improved if the injection molding is effected under such a condition that the recesses of the relief pattern are not completely filled with molten resin, although the transferability is poor. It is apparent that the stamper according to the present invention function to improve both of the transferability and the releasing property.

DESCRIPTION OF THE PREFERRED EMBODIMENT

Figure 1A:
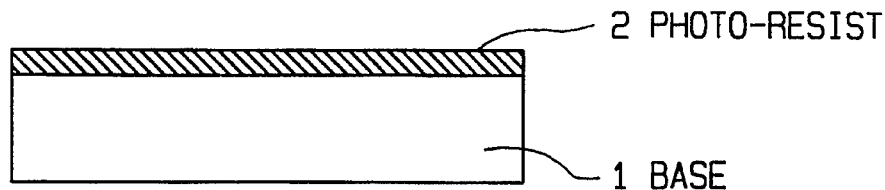
Figure 1B:
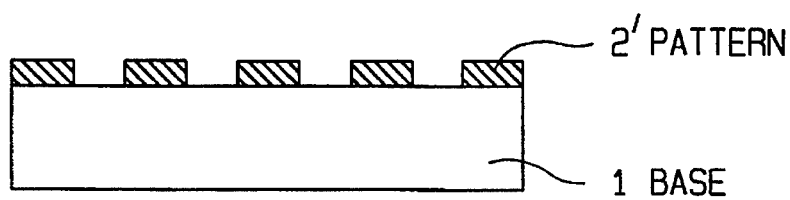
Figure 1C:
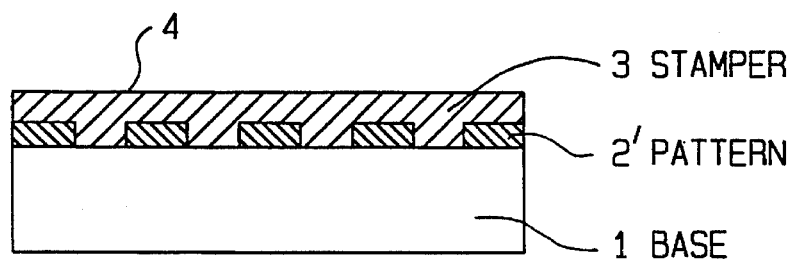
Figure 1D:
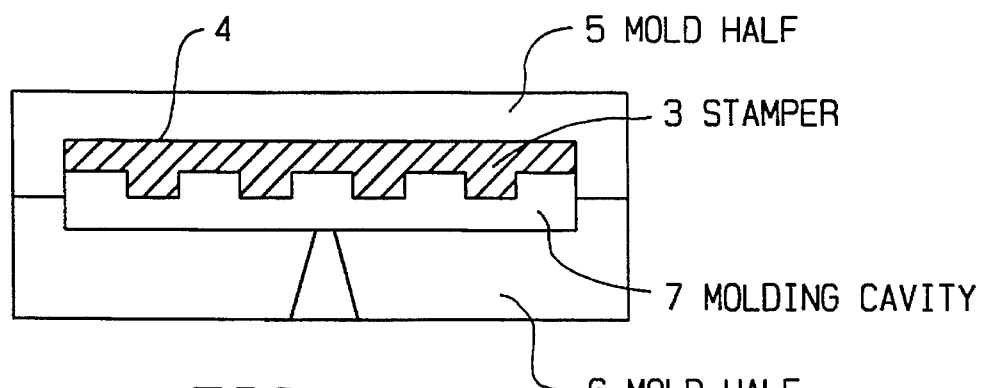

Now, the present invention will be described with referring to an example.

EXAMPLE 1

After a polished base disk of glass was coated with photo-resist, an EFM modified laser beam is directed onto the coated photo-resist layer. The exposed photo-resist layer was developed, washed and dried to obtain a master disk having spiral EFM modified signal pits arrays each having a depth of 1,200 Å.

A nickel stamper having a thickness of 300 μm was fabricated in a conventional electro-deposition unit. After a rear surface the stamper was polished by a polishing machine under a surface roughness of 0.1 S, a spindle hole was holed at a center of the stamper and an outer periphery of the stamper was trimmed to obtain a final stamper (polished tamper) for compact disks (CD) having a predetermined inner and outer diameters.

Then, the nickel stamper was further toughened according to the present invention. Namely, the rear surface of the final stamper was re-roughened by hands with a sandpaper No. 800 in such a manner that fine grooves were engraved along random directions on the rear surface of the final stamper. The surface roughness of the re-roughened rear surface was measured by a thin film instrument and found a value of 0.8 S.

Polycarbonate disk substrates (each having an outer diameter of 130 mm, a thickness of 1.3 mm) were mass-produced by an injection machine: Dinamelter M-700 manufactured by MEIKI SEISAKUSHO Co., Ltd. at a cylinder temperature of 330° C. and at a mold temperature of 110° C. No "cloud" was observed on thousand sample disk substrates were extracted arbitrarily from the total number of ten thousands substrates and observation by a scanned electron microscope (SEM) revealed that the transferability was good.

COMPARATIVE EXAMPLE

The same procedure as Example 1 was repeated except that the rear surface of the final stamper was not roughened. In this case, the "cloud" was observed on 350 substrates of polycarbonate disks on thousand sample disk substrates which were extracted arbitrarily from the total number of ten thousands substrates.

It is apparent from Example that plastic substrates for optical disks which are free from "cloud" and which can be released easily from the stamper can be produced without spoiling the transferability by a simple method in which the rear surface of the stamper is roughened at a surface roughness between 0.3 S and 2.0 S.

We claim:

1. A process for fabricating a stamper for injection molding a plastic substrate for an optical disk comprising the steps of
   (a) polishing a rear-surface of the stamper to a surface roughness value less than 0.1 S, and
   (b) re-roughening the polished rear-surface to a surface roughness value between 0.3 to 2.0 S, wherein both said surface roughness values are measured according to Japanese Industrial Standard JIS B 0601.

2. The process set forth in claim 1 wherein the stamper is made of nickel.

3. The process set forth in claim 1 wherein the plastic substrate is made of polycarbonate.

4. The process set forth in claim 1 wherein the rear surface of the stamper is roughened by hands with a sandpaper.

* * * * *